United States Patent [19]
Förster

[11] 4,190,878
[45] Feb. 26, 1980

[54] SELF-HEALING ELECTRICAL CAPACITOR

[75] Inventor: Herbert Förster, Remshalden, Fed. Rep. of Germany

[73] Assignee: Robert Bosch GmbH, Stuttgart, Fed. Rep. of Germany

[21] Appl. No.: 918,431

[22] Filed: Jun. 23, 1978

[30] Foreign Application Priority Data

Jul. 2, 1977 [DE] Fed. Rep. of Germany ....... 2730038

[51] Int. Cl.² ............................................ H01G 1/017
[52] U.S. Cl. ..................................... 361/305; 361/273
[58] Field of Search ................................ 361/273, 305

[56] References Cited

U.S. PATENT DOCUMENTS 3,179,862  4/1965  Dublier ........................... 361/273 X 3,763,409  10/1973  Shoard .

FOREIGN PATENT DOCUMENTS 2359432  6/1975  Fed. Rep. of Germany .......... 361/305
768366  2/1957  United Kingdom ................... 361/305

Primary Examiner—E. A. Goldberg
Attorney, Agent, or Firm—Frishauf, Holtz, Goodman & Woodward

[57] ABSTRACT

The disintegration of the aluminum layer in standard capacitors which takes place as a function of electric field strength is prevented by use of a thin coating which includes a small amount of evenly distributed copper. The average percentage in weight of copper in an aluminum layer is preferably between 2 and 5 percent. The coating is vapor deposited.

6 Claims, 2 Drawing Figures

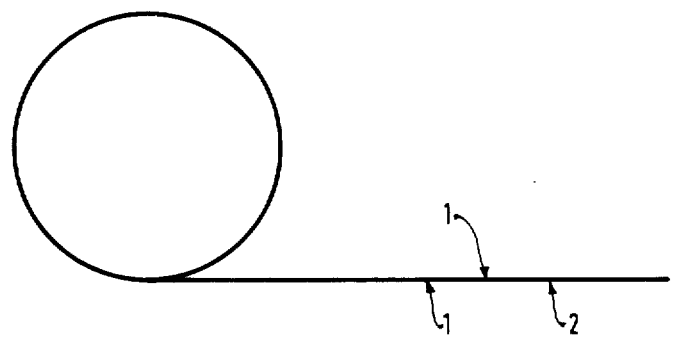
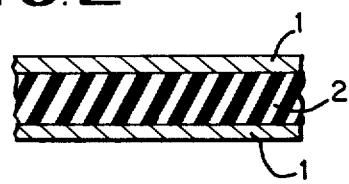

SELF-HEALING ELECTRICAL CAPACITOR

The present invention relates to self healing electrical capacitors. More particularly, it relates to AC capacitors which have thin aluminum layers which deteriorate increasingly with increasing field strength.

BACKGROUND AND PRIOR ART

In known capacitors of the above-described type, in which the thin aluminum layers have surface resistances, that is resistances per square unit of approximately 3 ohms, a circular disintegration of the aluminum layer sets in if the average electrical field strength in the dielectric exceeds a predetermined value. This causes surface losses which lead to decreasing capacitance values. For a capacitor utilizing a polypropylene sheet as dielectric the deterioration of the aluminum surface starts at an effective field strength of approximately 40 V/$\mu$m at a frequency of 50 Hz. In order to prevent this undesired decrease in capacitance in the known capacitors, smaller field strength are utilized then would otherwise be permitted by the dielectric. For example fluorescent lamp condensors with metallized polypropylene sheets as dielectric and with the known aluminum coatings are manufactured from sheets having a thickness of 8 $\mu$m for nominal voltages of 220 to 250 volts at 50 Hz, even though thickness of 6 $\mu$m would suffice for sufficiently thin aluminum layers having a surface resistance exceeding 3.5 ohms. However the resulting field strength would be too high because testing takes place at a voltage exceeding the nominal voltage by about 25%, thereby causing the above-mentioned deterioration of the aluminum layer. This deterioration therefore also causes higher costs for the capacitor and a greater volume then would otherwise be necessary.

THE INVENTION

It is an object of the invention to prevent the deterioration of the aluminum layer to the extent that this deterioration does not take place at the highest possible field strength for the dielectric being used or a least to reduce this deterioration to a point where it is negligible. It is a further object of the invention to furnish reliable single layer capacitors of metallized polypropylene or polycarbonate sheets having a thickness of 6 $\mu$m for operation at nominal rms AC voltages of 320 volts, at a thickness of 8 $\mu$m for operation between 400 and 500 volts, and at a thickness of 9 $\mu$m and up for voltages exceeding 500 volts.

In accordance with the invention, the coating on the dielectric contains a small amount of evenly distributed copper. In a preferred embodiment the coating is an aluminum coating which is vapor deposited on the dielectric. The percentage by weight of copper ranges between 0.5 and 10% and is preferably between 2 and 5%. Proportions of copper of less than 0.5% which may be present as impurities during the manufacturing process are ineffective in the sense of the present invention. For proportions exceeding 10% it is to be expected that the same surface disintegration may occur in the copper alloy as is observed in the aluminum layer. Vapor depositing of the coating has the advantage of creating very even layers at a relatively low cost. The self healing characteristics of the electrical capacitor are particularly good when the aluminum layer is, on the average, less than 10 $\mu$g aluminum per square centimeter of the surface being coated. A lower limit of approximately 4 $\mu$g/cm$^2$ is recommended so that the magnitude of the surface resistance is limited depending upon the requirements of the vapor deposit process. The single figure shows the simplest form of a capacitor manufactured in accordance with the present invention.

DRAWINGS

FIG. 1 is a schematic representation of a roll capacitor; and

FIG. 2 is a schematic, highly enlarged, and distorted, cross-section through a layer.

DESCRIPTION OF PREFERRED EMBODIMENTS

In a preferred embodiment an aluminum layer having a proportion by weight of copper of approximately 4% and a surface resistance of 5 to 7 ohms was vapor deposited in a vacuum by thermal vaporization on to a polypropylene ribbon having a thickness of 6 $\mu$m. The material to be vapor deposited was an aluminum-copper alloy wire, the total average surface coating of the vapor deposited material being approximately 7 $\mu$g/cm$^2$. A roll-type capacitor was manufactured from a pair of rolls of these ribbons. A single roll is shown in the figure, the coatings being denoted by reference numeral 1, the ribbon by reference numeral 2. For comparison purposes capacitors were also manufactured from the same polypropylene ribbons under the same conditions and with the same dimensions, but with the conventional aluminum coatings having a surface resistance of 2.5 to 3 ohms. The material vapor deposited on the ribbons was derived from highly pure aluminum wire. The average coating was approximately 9 $\mu$g/cm$^2$.

A test voltage of 412 volts at 50 Hz resulting in an average effective field strength of approximately 70 V/$\mu$m was applied to both sets of capacitors at a temperature of 85° C. After continuously applied voltage for 350 hours a circular deterioration of the coating and a resulting average loss of capacity of approximately 7% was found in the capacitors having the pure aluminum layers. This deterioration of the layers increased with increasing time of voltage application. No such deterioration of layers was noted in the capacitors having the alloyed layers in accordance with the present invention.

The layers in accordance with the present invention can be manufactured with any known physical or chemical metallization process. It is only required that the coating have a sufficient amount of the copper alloy in a sufficiently homogeneous distribution and that harmful impurities be avoided. It may for example be desirable to manufacture the layer from two separate initial materials instead of one alloyed initial material. If necessary the two initial materials may be vaporized in two separate crucibles. If the vaporization rate of the two components is different under the same vaporization conditions, it may be necessary to regulate the conditions in the different crucibles differently or, if a single alloyed initial material is used, to change the percentage of the copper alloy in correspondence to the difference in the vaporization rates.

The layers in accordance with the present invention may also be used in capacitors having a plurality of thin layers rather than a single layer. For example an aluminum alloy layer may serve as a corrosion inhibiting layer for a Zn coating because its oxide film is more resistant to external influences than is a Zn layer.

The coating according to the present invention allows capacitors to have a higher nominal field strength and therefore results in smaller capacitors which are also less expensive. The actual depositing of the layer does not require much additional equipment in practice especially if a vaporization process is used. Previously proposed multilayer systems are no longer required. However if the aluminum layer in accordance with the present invention is used in conjunction with a zinc layer, the higher conductivity of the aluminum and the protective effect of the aluminum oxide film will result in a decrease of the total thickness of the coating.

The use of the layer in accordance with the present invention has the further advantage that electrical breakdowns in the dielectric which may be the result of overvoltages clear without damage. Higher test voltages may be used without fear of an internal short circuit, thereby allowing higher test voltages and shorter testing times. Finally, because of the thinner layers shorter vaporization times are required and a lower thermal load is applied to the material receiving the coating.

The surface coatings in accordance with the present invention can be used for impregnated capacitors as well as to those which are not impregnated. The abovementioned deterioration of the pure aluminum layers was noted in impregnated capacitors as well as those without impregnation starting at a predetermined average field strength. For example in capacitors manufactured from paper ribbons metallized on both sides and free of electric field and polycarbonate sheets as dielectric, a deterioration of the aluminum layer was noted at an average field strength of approximately 80 V/$\mu$m (50 Hz) when a pure aluminum layer was used. For capacitors with a dielectric consisting of metallized paper of a thickness of 8 $\mu$m polypropylene sheets of thickness 6 $\mu$m with an aluminum layer of approximately 15 ohms a deterioration of the layer was noted at a voltage of 475 volts at 50 Hz.

The self-healing capacity of the capacitors is better the less material is used in the layer because then the energy liberated in the arc is less. The use of the surface coating in accordance with the present invention allowed a great decrease in the thickness of the coating. For an aluminum coating a part of the aluminum is always in a combined form, particularly a hydroxide or an oxide. The weight of aluminum is, on the average, between 4 and 10 $\mu$g aluminum per square centimeter of the surface being coated.

The percentage by weight of copper in the aluminum-copper alloy wire described above as utilized in the preferred embodiment was approximately 4% and vapor deposition took place in an evacuated vessel (less than $10^{-4}$ Torr) at room temperature of the vessel.

In the embodiment of a capacitor with an aluminum alloy layer on a zinc coating the thickness of the zinc coating was: approximately 10 $\mu$g/cm$^2$.

The vapor deposit was created from a crucible filled with Zn and vapor deposition took place in an evacuated vessel (less than $10^{-1}$ Torr) at room temperature of the vessel.

The following publications disclose self-healing capacitors: German Published patent application DE-AS No. 1,564,792; German Published patent application DE-OS No. 1,764,704 German Published patent application DE-OS No. 1,815,478.

Various changes and modifications may be made within the scope of the inventive concept.

I claim:

1. In an electrical capacitor having a dielectric and an electrode aluminum coating on said dielectric and an opposed electrode, the improvement comprising a substantially evenly distributed proportion of copper in said coating, said proportion ranging between 0.5% and 10% by weight, for substantially decreasing the deterioration of said coating as a function of field strength.

2. A capacitor as set forth in claim 1, wherein said proportion by weight of copper is between 2% and 5%.

3. A capacitor as set forth in claim 2, herein said aluminum coating has an average weight of between 4 and 10 $\mu$g per square centimeter of said dielectric.

4. A capacitor as set forth in claim 3, wherein said aluminum coating is a vapor deposit.

5. A capacitor as set forth in claim 4, wherein said dielectric comprises plastic foil.

6. In an electrical capacitor having a dielectric area and a zinc layer on said dielectric, the improvement comprising an aluminum coating on said zinc layer, said aluminum coating having an average weight of between 4 and 10 $\mu$g per square centimeter of surface area of said zinc layer, and a substantially evenly distributed proportion of copper in said aluminum coating, said proportion ranging between 0.5% and 10% by weight, for substantially decreasing the deterioration of said coating as a function of field strength.

* * * * *